United States Patent [19]

Van Horne

[11] 4,205,091
[45] May 27, 1980

[54] EDIBLE SERVER

[76] Inventor: William J. Van Horne, P.O. Box 39113 Bolton Station, Atlanta, Ga. 30318

[21] Appl. No.: 627,943

[22] Filed: Nov. 3, 1975

[51] Int. Cl.² .......................................... A21D 13/00
[52] U.S. Cl. .................................... 426/138; 426/139; 426/143; 426/144; 426/283
[58] Field of Search ................. 426/143, 138, 139, 91, 426/96, 95, 283, 144, 128, 134; D1/2–11

[56] References Cited

U.S. PATENT DOCUMENTS

| 1,144,794 | 6/1915 | Rousseau | 476/283 |
| 1,174,826 | 3/1916 | Chapman | 426/138 |
| 1,615,680 | 1/1927 | Buhse | 426/139 |
| 3,764,344 | 10/1973 | Glabe et al. | 426/138 |
| 3,840,678 | 10/1974 | Price | 426/104 |
| 3,908,022 | 9/1975 | Selleck | 426/138 X |

Primary Examiner—Esther M. Kepplinger
Attorney, Agent, or Firm—Robert B. Kennedy

[57] ABSTRACT

An edible server is disclosed comprising an elongated wafer formed with a series of cup-shaped receptacles sized for individual disposition within a human mouth and with bridges joining adjacent receptacles together with each bridge having a score line extending between and segmenting adjacent cup-shaped receptacles. The cup-shaped receptacles may be filled with fluid foodstuff, serially inserted into a human mouth, and individually broken from the remainder of the wafer along the score lines and eaten.

2 Claims, 6 Drawing Figures

EDIBLE SERVER

BACKGROUND OF THE INVENTION

This invention relates generally to edible servers, and particularly to edible servers of the type adapted to be filled with fluid foodstuffs.

Edible servers typically comprise dough based compositions baked into a shape for supporting fluid foodstuffs. In one quite common form edible servers encapsulate fluid foodstuffs with the server and encapsulated fluid foodstuff being cooked simultaneously. Ravioli, for example, may be prepared in this manner as disclosed by U.S. Pat. No. 2,386,993. Pies and tarts are also typically prepared in this general manner as exemplified in U.S. Pat. No. 1,841,494. Filled Wafers may also be used in forming encapsulated structures as disclosed by U.S. Pat. No. 1,166,056. A prime attribute of server encapsulated foods is, of course, that they may be completely prepared with only a warming often required immediately prior to consumption.

Another form of edible server is that in the shape of a grid which defines openings in which ice-cream is packed in a frozen state. As disclosed by U.S. Pat. No. 2,950,200 grid shaped servers may also be used to support other foodstuffs at room temperature such as cheeses and jams. Again, this form of edible server is ordinarily preassembled with the food it supports by the manufacturer rendering little if any additional preparatory work required by the consumer. Yet another type of edible server, exemplified by that disclosed in U.S. Pat. No. 1,936,835, comprises a cup-shaped support member, much like an ice-cream cone, but which is adapted to be filled with cheese or jam by the manufacturer or freshly filled to a customer's order immediately prior to consumption.

While the just described edible servers have heretofore satisfied the palates of millions of consumers, they have not been constructed so as to placate many epicurean fancies. For example, those that are prepacked with fluid foodstuffs cannot readily support freshly prepared foods such as hot soups, chili or even many foods of medium viscosity. The encapsulated servers also inherently must store a substantial proportion of the foodstuffs which storage often tends to degrade the taste of the encapsulated foodstuffs and even the encapsulating server itself. The open top servers are difficult to fill prior to consumption due to the narrowness of their necks and also incapable of supporting a plurality of diversely constituted fluid foodstuffs without their intermingling and thereby confusing their distinctive tastes.

Accordingly, it is a general object of the present invention to provide an improved edible server.

More specifically, it is an object of the present invention to provide an edible server of the type adapted to receive and support fluid foodstuffs immediately prior to consumption.

Another object of the invention is to provide an edible server capable of being filled immediately prior to consumption with a plurality of foodstuffs of individually distinctive composition without their intermingling.

Another object of the invention is to provide an edible server of the type described which may be filled with facility and with minor inaccuracies in filling operations not necessarily resulting in spillage from the server.

Another object of the invention is to provide an edible server of the type described capable of being consumed section by section without structural degradation of the server of a nature as to cause unconsumed fluid foodstuffs remaining supported thereon to spill from the container.

Yet another object of the invention is to provide edible servers of the type described capable of being stacked compactly in storage prior to their being filled with fluid foodstuffs for consumption.

SUMMARY OF THE INVENTION

In one form of the invention an edible server is provided comprising an elongated wafer formed with a series of cup-shaped receptacles sized for individual disposition within a human mouth, and with bridges joining adjacent receptacles together with each bridge having a score line extending between and segmenting adjacent cup-shaped receptacles. So constructed, the cup-shaped receptacles may be filled with fluid foodstuffs, serially inserted into a human mouth, and individually broken off from the remainder of the wafer along the score lines and eaten.

In another form of the invention an edible server is provided comprising a plurality of open-top recepticles joined consecutively together with score lines between adjacent receptacles spaced apart a distance consecutively engagable by a set of human teeth with one receptacle disposed substantially intact within the human mouth. So constructed, the receptacles may be individually filled with liquid foodstuffs, serially inserted into a human mouth and bitten off from the other receptacle remaining inside the mouth.

DESCRIPTION OF THE PREFERRED EMBODIMENTS

Figure 1:
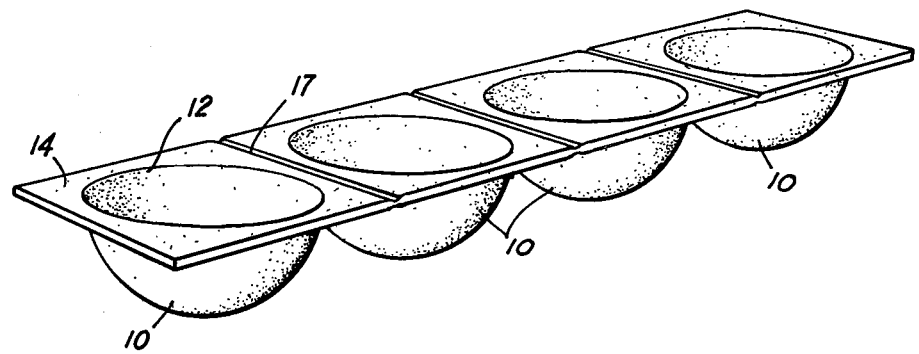
FIG. 1 is a perspective view of an edible server embodying principles of the invention in one preferred form.
Figure 2:
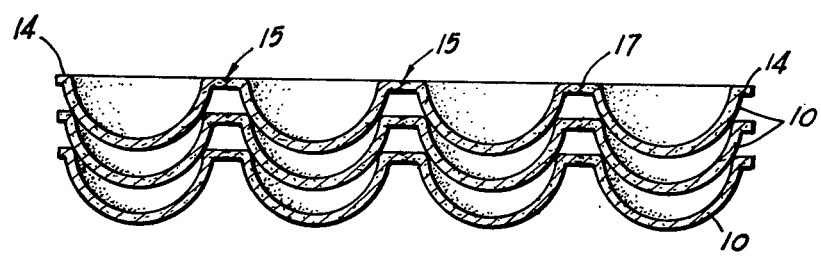
FIG. 2 is a cross-sectional view of a set of edible servers of the type shown in FIG. 1 shown stacked together one atop the other.
Figure 3:
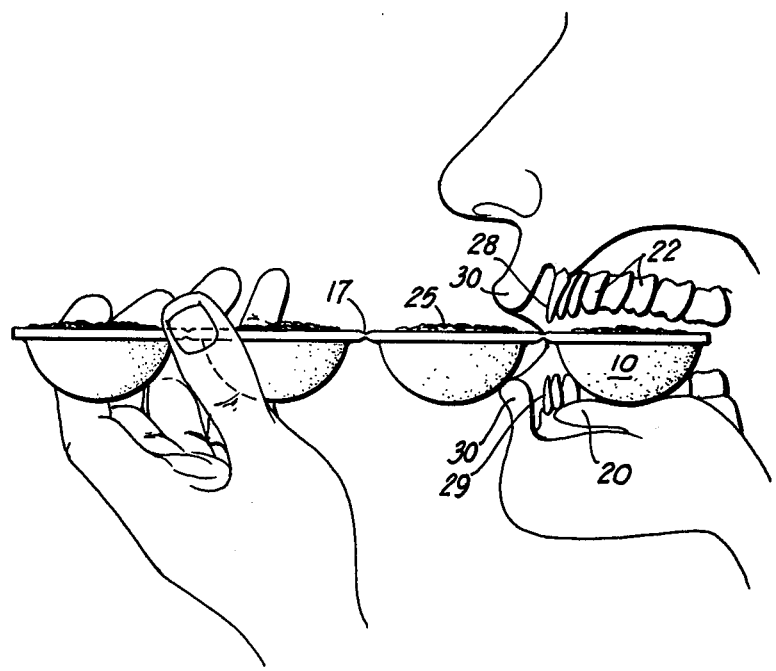
FIG. 3 is a side-elevational view of the edible server shown in FIG. 1 in position for consumption by a human being.

Referring now in more detail to the drawing, there is shown in FIGS. 1–3 an edible server which may have a constituency similar to that of soda crackers, ice-cream cones or various other baked, usually flour based food products. The server is in the general shape of an elongated wafer having four consecutively arranged open-top, cup-shaped receptacles 10. The receptacles in this configuration are generally in the shape of hemispheres having rounded, concave inner surfaces and rounded, convex outer surfaces. From their lips 12 extend planar flanges 14 with the flat upper and lower surfaces of the flange about each receptacle being substantially coplanar. The flanges of adjacent receptacles merge together in a bridge section 15 located between and bridging together adjacent receptacles. At their point of juncture is formed a score line 17 of reduced flange thickness. This line is here provided by opposed indentations in both the upper and lower surfaces of the flanges forming the bridge sections.

Each of the open-top, cup-shaped receptacles 10 is sized to be held momentarily intact within a human mouth as shown in FIG. 3. Preferably, the inside diameter of each receptacle is between approximately 1 and 1½ inches although multiple smaller receptacles may be grouped together. The distance between adjacent score lines preferably is such as to enable a line to be contacted by the cuspids 28 or lips 30 of the consumer while one or more of the recepticles is momentarily positioned within the mouth as shown.

After manufacture the servers may be stacked one upon the other as shown in FIG. 2 with a portion of each of the receptacles disposed within adjacent receptacles. This compact arrangement facilitates both packaging and storage. After stacked, the servers may be placed within an unshown container and shipped to a retail outlet such as a restaurant. As customer demands dictate the packages are opened, the stacks of servers removed, placed readily accessible, and removed one at a time from the stack. The food preparer may then grip an individual server in hand and then pour a liquid foodstuff 25 into the open-top receptacles. The foodstuff may be hot such as soups or chili, cold such as ice cream, or any number of various items served at room temperature. In filling the server slight misalignment in pouring is retained on flanges 14 rather than spill off the server.

The provision of an agent such as shortening and coconut oil into the constituency of the server is recommended as an aid in preventing the fluid foodstuff within the retainers from rendering the server itself soggy for a brief period of time. Thus, the structural integrity of the server is maintained as is its crisp taste. If desired, liquid foodstuffs of individually distinct composition and flavor may be poured into the several receptacles of any single server.

With the edible server supporting fluid foodstuffs within its several receptacles, a consumer may grip it and introduce an end-member receptacle into his or her mouth as shown in FIG. 3. The bottom of the receptacle may be placed momentarily upon the consumer's tongue 20 with his molars 22 disposed above the receptacle and the fluid foodstuff supported therewithin. This relative disposition simultaneously enables the consumer's upper cuspids 28 and lower cuspids 29 to be respectively positioned above and below a bridge section 15 of the wafer linking the receptacle disposed within the mouth with the next successive receptacle disposed without the mouth. A bringing together of the teeth thus causes the cuspids to engage the bridge section in the vicinity of the score line 17 causing the receptacle within the mouth to be severed from the remainder of the wafer held outside of the mouth. The wafer then may be moved away from lips 30 and that portion of the server and foodstuffs within the mouth crushed and masticated. Following this operation the next successive receptacle 10 may be inserted into the mouth and the operation repeated until the last receptacle is ingested.

Figure 4:
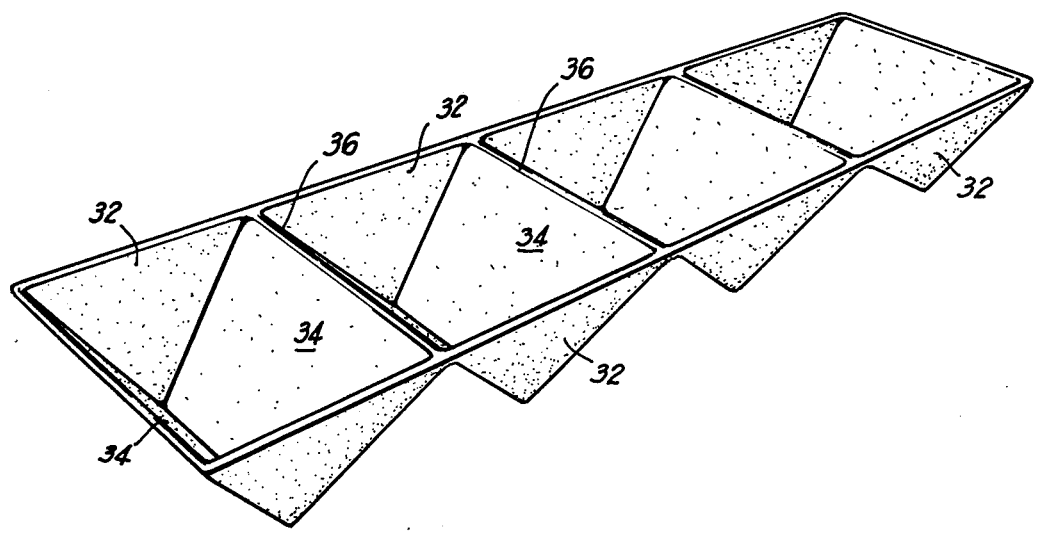
FIG. 4 is a perspective view of an edible server embodying principles of the invention in another preferred form.
Figure 5:
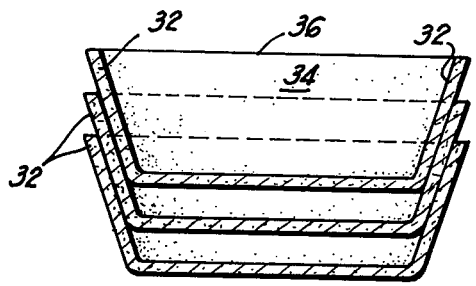
FIG. 5 is an end-on view in cross-section of a set of edible servers of the type shown in FIG. 4 stacked one upon the other.

Referring next to FIGS. 4 and 5, an edible server is illustrated embodying principles of the invention in an alternative form. Here the edible server is seen to be composed of four, serially arranged receptacles with each receptacle having a pair of triangular side-walls 32 and a pair of trapezoidal floor members 34 linking the side members together. One floor member of one receptacle is seen to merge at its upper edge with the upper edge of a floor member 34 of the next successive receptacle. The region of mergers may thus be considered to constitute bridge portion of the wafer. In this embodiment the score line is provided by the mere junction of the triangular shaped side-walls and trapezoidal shaped floor members of adjacent receptacles. Thus, it should be understood that for purposes of this application the term score line is not limited to notches or indentations but rather denotes an elongated region of minimal wafer thickness and relatively high fragility delineating a line of structural weakness. It should also be noted that the upper surface 36 of the wafer here is planar and includes the periphery of the individual receptacles including the juncture of adjacent side-walls and floor members. That the side-walls 32 and floor members 34 slope outwardly from the bottom of the receptacle enables groups of servers to be stacked as shown in FIG. 5, with a portion of each receptacle nestled within a portion of the receptacle of an adjacent server. In consuming the server the procedure previously described in conjunction with the embodiment shown in FIGS. 1–3 may be followed.

Figure 6:
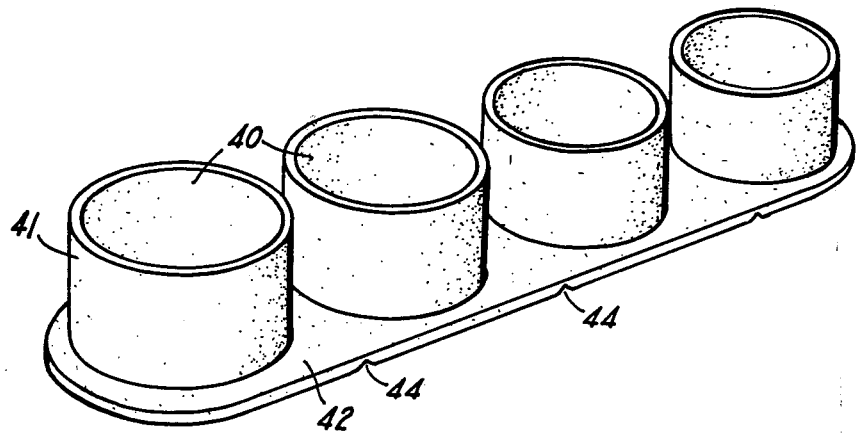
FIG. 6 is a perspective view of an edible server embodying principles of the invention in yet another form.

With reference next to FIG. 6 an edible server constituted as previously described is shown in yet another form wherein four receptacles having cylindrical, interior walls 40 and cylindrical, exterior walls 41 are shown mounted atop a base 42. The base of each receptacle is seen to merge into the base of the adjacent server with the region of merger constituting bridge portions of the wafer. Both the upper and lower surfaces of the several bases are seen to be substantially flat and coplanar. An indentation 44 is formed in the lower surface of the bases in the bridge portions. Again, the preparation and consumption of the server may be accomplished as hereinbefore described.

It should be understood that the just described embodiments merely illustrate principles of the invention in preferred forms. Many modifications, additions and deletions other than those specifically illustrated and described may, of course, be made thereto without departure from the spirit and scope of the invention as set forth in the following claims.

What is claimed is:

1. A set of edible servers each comprising an elongated wafer formed with a series of cup-shaped receptacles sized for individual disposition within a human mouth and with bridges joining adjacent receptacles together with each bridge having a score line extending between and segmenting adjacent cup-shaped receptacles and wherein said cup-shaped receptacles have substantially flat, mutually coplanar flanges extending from their lips and merging with said bridges whereby the cup-shaped receptacles may be filled with fluid foodstuff, serially inserted into a human mouth, and individually broken off from the remainder of the wafer along the score lines and eaten, and wherein said edible servers are stacked one upon the other with at least a portion of the cup-shaped receptacles of one server nestled within the cup-shaped receptacles of another server.

2. A set of edible servers each comprising a plurality of open-top receptacles joined consecutively together with score lines between adjacent receptacles spaced apart a distance consecutively engagable by a set of human teeth with one receptacle disposed substantially intact within the human mouth, whereby the receptacles may be individually filled with liquid foodstuff, serially introduced into a human mouth and bitten off from other receptacles remaining outside the mouth, and wherein said edible servers are stacked one upon the other with at least a portion of the open-top receptacles of one server nestled within the open-top receptacles of another server.

* * * * *